(12) United States Patent
Lee

(10) Patent No.: US 12,240,763 B2
(45) Date of Patent: Mar. 4, 2025

(54) METHOD FOR PREPARING HYDRONIUM ION-DISSOLVELD WATER

(71) Applicant: In Sang Lee, Seongnam-si (KR)

(72) Inventor: In Sang Lee, Seongnam-si (KR)

( * ) Notice: Subject to any disclaimer, the term of this patent is extended or adjusted under 35 U.S.C. 154(b) by 675 days.

(21) Appl. No.: 17/430,706

(22) PCT Filed: Apr. 16, 2020

(86) PCT No.: PCT/KR2020/005122
§ 371 (c)(1),
(2) Date: Aug. 12, 2021

(87) PCT Pub. No.: WO2020/218776
PCT Pub. Date: Oct. 29, 2020

(65) Prior Publication Data
US 2022/0073346 A1    Mar. 10, 2022

(30) Foreign Application Priority Data
Apr. 20, 2019 (KR) .......................... 10-2019-0046394

(51) Int. Cl.
*C01B 5/00* (2006.01)
*B01D 15/36* (2006.01)
(Continued)

(52) U.S. Cl.
CPC ............. *C01B 5/00* (2013.01); *B01D 15/361* (2013.01); *B01D 46/00* (2013.01); *C25B 1/044* (2021.01)

(58) Field of Classification Search
CPC ........ C01B 5/00; B01D 15/361; B01D 46/00; B01D 15/26; B01D 71/06; C25B 1/044;
(Continued)

(56) References Cited

U.S. PATENT DOCUMENTS 9,403,699 B2    8/2016    Matsuyama

FOREIGN PATENT DOCUMENTS

JP    2002-205032 A    7/2002
JP    2010-075095 A    4/2010
(Continued)

OTHER PUBLICATIONS

KR Office Action dated Jul. 1, 2019 as received in Application No. 10-2019-0046394.
(Continued)

*Primary Examiner* — Jacob M Amick
*Assistant Examiner* — Charles J Brauch
(74) *Attorney, Agent, or Firm* — Maschoff Brennan

(57) ABSTRACT

The present disclosure provides a method for preparing hydronium ion-dissolved water including: (a) purifying distilled water to prepare deionized water; (b) electrolyzing the water to produce a brown gas stream; (c) mixing air with the brown gas stream to form a mixed gas stream; (d) injecting the mixed gas stream into the deionized water and dissolving the mixed gas to prepare gas-dissolved water; and (e) injecting the gas-dissolved water into thin-layer chromatography, filtering the gas-dissolved water through a stationary phase provided inside the thin-layer chromatography, and then fractionating to adjust the concentration of dissolved gas. Accordingly, functional water in which hydronium ions are dissolved be can effectively prepared.

10 Claims, 9 Drawing Sheets

(51) Int. Cl.
  *B01D 46/00*  (2022.01)
  *C25B 1/044*  (2021.01)
(58) Field of Classification Search
  CPC ..... C25B 1/04; C02F 1/68; C02F 1/42; A01G
            7/06; C05D 9/00
  See application file for complete search history.

(56) References Cited

FOREIGN PATENT DOCUMENTS

| | | |
|---|---|---|
| KR | 10-0761099 B1 | 10/2007 |
| KR | 10-0872968 B1 | 12/2008 |
| KR | 10-1396283    | 5/2014 |
| KR | 10-1608475 B1 | 4/2016 |
| KR | 10-2091378 B1 | 3/2020 |

OTHER PUBLICATIONS

KR Office Action dated Jan. 8, 2020 as received in Application No. 10-2019-0046394.

(A)

(B)

(C)

(D)

Control          H3O+ 200 ml          H3O+ 500 ml

METHOD FOR PREPARING HYDRONIUM ION-DISSOLVELD WATER

TECHNICAL FIELD

The present disclosure relates to hydronium ion-dissolved water, and more particularly, to a method for preparing hydronium ion-dissolved water by effectively dissolving the hydronium ion in distilled water.

BACKGROUND ART

In general, water is an essential element for all life on Earth to sustain life. About 70% of the human body consists of water, and about 80% of an infant's body consists of water, wherein about 83% of blood and 86% of the lungs and liver are made of water.

Therefore, when water is insufficient, waste products and toxins accumulate in the body and cause various diseases. Water plays a vital role in helping the excretion of waste products in the body and intake of cellular nutrients.

On the other hand, as new physical and chemical properties of water have been identified, its usability as a variety of solvents is increasing, and there are various attempts to use its hydrogen bond-forming ability and as an amphoteric material.

In particular, biologists are focusing on the fact that water is a major component of designing biomolecules, and they are continuing their attempts to apply the physical and chemical properties of water. Various studies are being conducted for using water in proton delivery methods for treating disease by constantly maintaining or changing the potential of cells.

As an example where such properties of water are used, Korean Patent No. 10-1396283 discloses an electrolyzed water-making apparatus, where an electrolytic cell in which an electrolysis chamber is provided in a casing, is fixed to an installation base by a fixture attached to the electrolytic cell, and supply of an aqueous electrolyte solution to the electrolytic cell and derivation of an electrolytic material generated in the electrolytic cell are performed by a pipe group.

The electrolyzed water-making apparatus and the electrolyzed water-making process using the same are directed to solve the problem of controlling and adjusting the concentration of hydrogen ions, but there are no cases of using a proton transfer process capable of utilizing the new physical and chemical properties of water.

As a related prior art document, there is Korean Patent No. 10-1396283, an electrolyzed water producing apparatus (published on May 16, 2014).

SUMMARY OF INVENTION

Technical Problem

The present disclosure is directed to provide hydronium ion-dissolved water in which hydronium ($H_3O^+$) ions are effectively dissolved in water for proton transfer, which accordingly increases biological properties of inhibiting inflammation, virus growth, cancer, etc. and physicochemical properties such as bleaching, disinfection, surfactation, etc.

Technical Solution

The present disclosure provides a method for preparing hydronium ion-dissolved water including: (a) purifying distilled water to prepare deionized water; (b) electrolyzing the water to produce a brown gas stream; (c) mixing air with the brown gas stream to form a mixed gas stream; (d) injecting the mixed gas stream into the deionized water and dissolving the mixed gas to prepare gas-dissolved water; and (e) injecting the gas-dissolved water into thin-layer chromatography, filtering the gas-dissolved water through a stationary phase provided inside the thin-layer chromatography, and then fractionating to adjust the concentration of dissolved gas.

Further, in step (a), the distilled water may be passed through an ion exchange resin such that the specific resistance is adjusted to 15 to 18 $M\Omega \cdot cm$.

Further, in step (b), sodium hydroxide may be added to the water at 0.01 to 0.05% (w/w), and a voltage of 100 to 110 V and a current of 10 to 20 mA may be applied to generate the brown gas stream.

Further, in step (b), the brown gas stream may be passed through a filter to be filtered.

Further, in step (c), the concentration of hydrogen and oxygen in the brown gas stream may be diluted by mixing air with the brown gas stream in a volume ratio (v/v) of 1:1~2.

Further, in step (d), the mixed gas stream may be dissolved in the deionized water by pressurizing the mixed gas stream at a pressure of 50 to 100 psi.

Further, in step (d), the mixed gas stream may be dissolved by injecting the mixed gas stream into the deionized water for 30 minutes to 2 hours.

Further, in step (d), hydronium ions ($H_3O^+$) may be dissolved by injecting the mixed gas stream into the deionized water.

Further, in step (e), the gas-dissolved water may be injected into the thin-layer chromatography, wherein the stationary phase of the thin-layer chromatography filters inorganic material with a microporous polymer membrane.

Further, in step (e), the gas-dissolved water injected into the thin-layer chromatography, filtered, and then discharged may be fractionated, wherein the fractionated gas-dissolved water may be injected into a pressure vessel such that the concentration of the dissolved gas in the gas-dissolved water is adjusted to 2.5 to 2.7 vol %.

According to another aspect of the present disclosure, the present disclosure provides a method for cultivating plants using hydronium ion-dissolved water including: (1) preparing hydronium ion-dissolved water according to a method for preparing hydronium ion-dissolved water, according to any one of claims 1 to 10; (2) preparing functional water by adding silica to the hydronium ion-dissolved water; and (3) applying the functional water to crop.

Further, in step (2), any one or more selected from the group consisting of $Al_2O_3$, $CaO$, $Na_2O$, $K_2O$, and $Fe_2O_3$ may be further added to the functional water.

Advantageous Effects

The method for preparing hydronium ion-dissolved water according to the present disclosure provides the following effects.

First, a brown gas stream is generated and dissolved in distilled water to maintain a constant state in which hydronium ions are dissolved in distilled water, so that hydronium ion-dissolved water can be prepared, and its biological and physicochemical properties can be effectively utilized.

Second, hydronium ion-dissolved water can be prepared by injecting a brown gas stream into distilled water at a certain pressure and time to generate hydronium ions ($H_3O^+$) in distilled water, and changing the physical properties of distilled water such that the generated hydronium ions do not combine with water molecules and coexist semi-permanently.

Third, while distilled water is purified to remove impurities, dissolved oxygen, nitrogen, etc. are removed in advance in the process of preparing deionized water so that the brown gas stream is easily dissolved, thereby enabling mass production of hydronium ion-dissolved water.

Fourth, since the brown gas composed of oxygen and hydrogen is flammable and there is a risk of explosion during the dissolution process, it is diluted to a threshold point where it does not catch fire and is dissolved in distilled water, thereby enabling safer preparation of hydronium ion-dissolved water.

Fifth, by preferentially removing dissolved oxygen and nitrogen, various inorganic substances and impurities that affect biological and physicochemical properties through purification and filtration processes, proton transfer that can be shown by pure hydronium ions can increase the effects of inhibiting inflammation and viruses, and effects of bleaching, disinfection and surfactation.

BEST MODE FOR CARRYING OUT THE INVENTION

Hereinafter, preferred embodiments of the present disclosure will be described in detail with reference to the accompanying drawings.

The present inventors confirmed that when hydronium ions ($H_3O^+$) are dissolved in water ($H_2O$), they act as proton sharers and can show various biological and physicochemical properties. In order to dissolve the hydronium ions more effectively, a brown gas stream consisting of oxygen and hydrogen was formed, and when pressure was applied for a certain period of time to continuously dissolve the brown gas stream in distilled water, it was confirmed that hydronium ions were generated in the distilled water, thereby hydronium ion-dissolved water was prepared. By confirming the physical and chemical properties of the prepared hydronium ion-dissolved water, the present disclosure was completed.

Hereinafter, the present disclosure will be described in detail.

A method for preparing hydronium ion-dissolved water according to the present disclosure includes: (a) purifying distilled water to prepare deionized water; (b) electrolyzing the water to produce a brown gas stream; (c) mixing air with the brown gas stream to form a mixed gas stream; (d) injecting the mixed gas stream into the deionized water and dissolving the mixed gas to prepare gas-dissolved water; and (e) injecting the gas-dissolved water into thin-layer chromatography, filtering the gas-dissolved water through a stationary phase provided inside the thin-layer chromatography, and then fractionating to adjust the concentration of dissolved gas.

Figure 1:
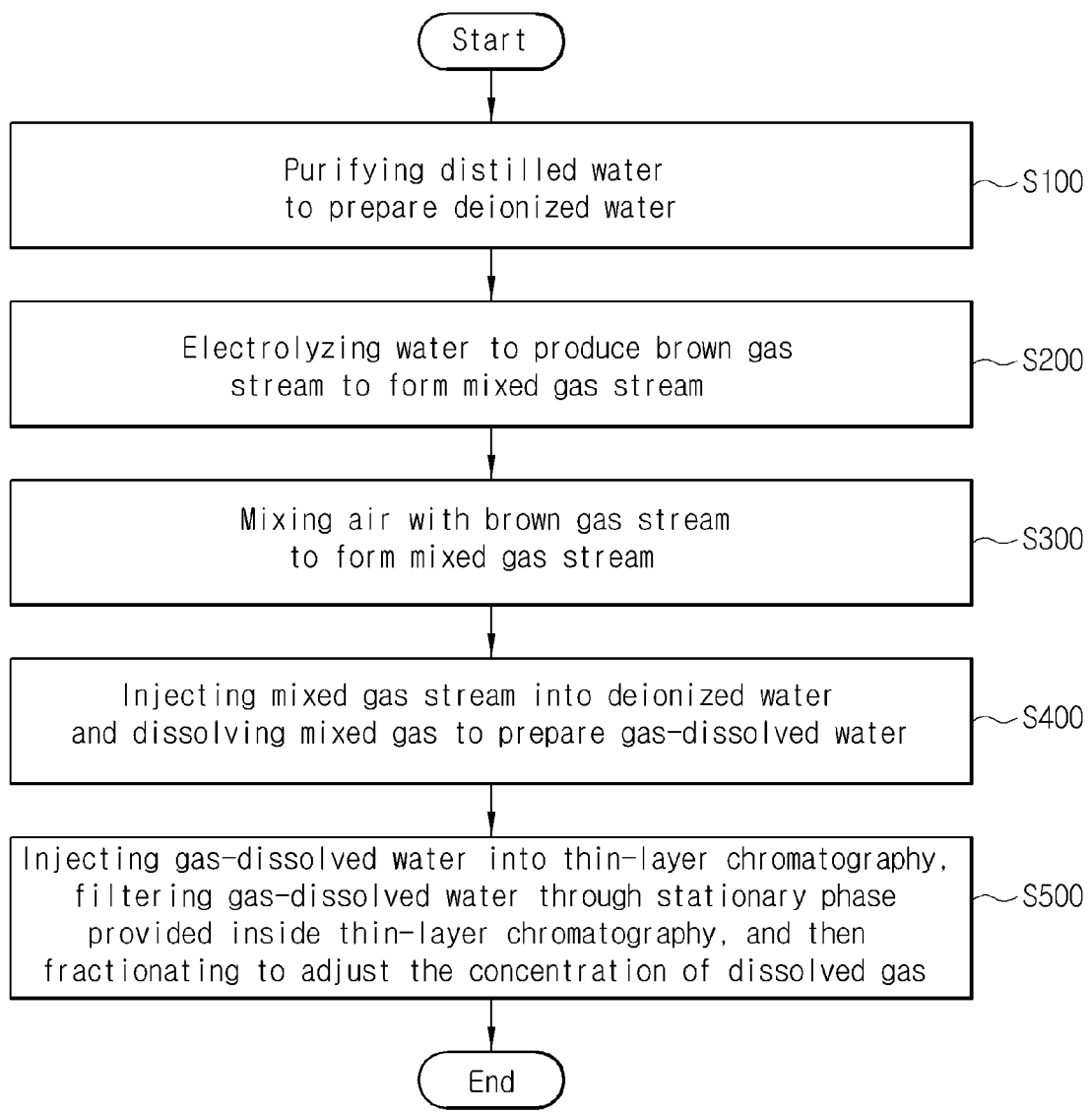
FIG. 1 is a process flow diagram of a method for preparing hydronium ion-dissolved water according to an embodiment of the present disclosure.

FIG. 1 is a process flow diagram of a method for preparing hydronium ion-dissolved water according to an embodiment of the present disclosure.

Referring to FIG. 1, first, distilled water is purified to prepare deionized water in step S100.

Water contains various inorganic salts and impurities, and when a large amount of dissolved oxygen and nitrogen is present and a large amount of positive and negative ions are present, there is a risk of chemical bonds being formed between ions.

In the above step S100, the distilled water may be passed through an ion exchange resin such that the specific resistance is adjusted to 15 to 18 MΩ·cm.

In the above specific resistance range, since the distilled water is close to being ultrapure water, when inorganic substances, impurities, and dissolved gases are removed and hydronium ions are dissolved, the hydronium ions do not bind or react with other substances, so a large amount of hydronium ions can be made to exist in the distilled water.

When the specific resistance is increased beyond the above range, the cost and manufacturing difficulty of the deionized water preparing process increases significantly, which is not efficient. In the case where the specific resistance is less than the above range, there is a problem of the proton transfer effect of hydronium ions being reduced due to the residual inorganic substances, impurities or dissolved gas reacting with hydronium ions described later.

Water is electrolyzed to generate a brown gas stream in step S200.

In step S200, sodium hydroxide is added to the water at 0.01 to 0.05% (w/w), and a voltage of 100 to 110 V and a current of 10 to 20 mA are applied to generate a brown gas stream.

If the sodium hydroxide is less than the above range, the electrolyte is not generated, and thus the efficiency of electrolysis is degraded. If it exceeds the above range, an insoluble salt is generated and a problem may occur where impurities need to be treated.

Brown gas can be generated in the voltage and current range, wherein the overall work (W) efficiency is high with respect to the production amount of brown gas, and since the brown gas can be continuously generated in the current range to form a brown gas stream, it is very advantageous for production.

In the conventional method for producing hydrogen water by electrolysis, a partition wall or pipeline is provided in the reactor to collect hydrogen at the negative electrode and collect oxygen at the positive electrode, and hydrogen gas is separately obtained to be dissolved and used as hydrogen water.

The brown gas stream according to an embodiment of the present disclosure is gas generated by directly electrolyzing distilled water with an electrode provided in a reactor, without having a separate partition wall or pipe at an upper part of the reactor.

The brown gas stream is produced by electrolysis of oxygen and hydrogen and simultaneously mixed and discharged in the gas phase.

The brown gas stream may be passed through a filter to be filtered.

Since some of the brown gas stream may be formed as vapor containing droplets, when the brown gas stream is filtered through a filter, it is possible to effectively prevent the mixing of inorganic substances or impurities when generating hydronium ions in deionized water.

In the electrolysis process, when oxygen and hydrogen gas are not separated from each other and are obtained as a mixed gas, dissolving the gas in deionized water can effectively increase the dissolved amount of hydronium ions in distilled water. When oxygen and hydrogen generated during electrolysis are added to water after the oxygen and hydrogen gas are obtained separated from each other, there is a problem that it is difficult to dissolve the hydronium ions, and the efficiency of the dissolving process in water is very low.

Air is mixed with the brown gas stream to form a mixed gas stream in step S300.

When the brown gas is continuously generated and supplied as a stream, brown gas consisting of only hydrogen and oxygen is flammable and difficult to handle, and when only brown gas is introduced into distilled water and dissolved, there is the problem of low efficiency.

The concentration of hydrogen and oxygen in the brown gas stream may be diluted by mixing air with the brown gas stream in a volume ratio (v/v) of 1:1~2.

In the case of forming a mixed gas stream by diluting the brown gas stream in the above range, the flammability is reduced, whereby fire and explosion due to pressurization of gas or leakage during the process can be effectively prevented, and the mixed gas stream can be pressurized safely and dissolved in the distilled water effectively.

In an embodiment of the present disclosure, the mixing of the brown gas stream and air is preferably carried out along a pipeline provided with soundproof and explosion-proof equipment.

Although noise can be generated and there is a risk of explosion by rapid diffusion of hydrogen and oxygen when the brown gas stream is mixed with air, if soundproof and explosion-proof equipment is provided, step S300 can be safely and efficiently performed.

The mixed gas stream is injected into deionized water to dissolve the mixed gas to prepare gas-dissolved water in step S400.

The process of dissolving the mixed gas is performed by pressurization using a pump.

The mixed gas stream may be dissolved in the deionized water by pressurizing the mixed gas stream at a pressure of 50 to 100 psi.

By pressurizing the mixed gas stream in the above range, the mixed gas can be quickly and efficiently dissolved in the deionized water, and it is easy to control the dissolved amount of the mixed gas in the deionized water.

If the pressure is less than the above range, the dissolved amount of the mixed gas is reduced, making it difficult to control the concentration of the dissolved gas in the step described below. If the above range is exceeded, it is difficult to control the pressure, and compared to the excessive energy being consumed, it is not effective since the amount of mixed gas dissolved in the deionized water from the mixed gas is limited.

The mixed gas stream may be dissolved by injecting the mixed gas stream into the deionized water for 30 minutes to 2 hours.

When the mixed gas stream is injected within the above range, hydronium ions ($H_3O^+$) may be generated in the deionized water, and the dissolved amount may be greatly increased.

If the injection time of the mixed gas is less than the above range, hydronium ions cannot be present in the deionized water, and if the time is exceeded, the total amount of hydronium ions dissolved in the deionized water does not increase any more.

On the other hand, in the case where water is electrolyzed as it is, conditions such as hydrogen ion concentration, redox potential, or pH within the range in which the change in the physicochemical properties of the water can be confirmed for the electrolytic reduced water or hydrogen water has to be confirmed through a specific experimental process. However, according to an embodiment of the present disclosure, in the case of preparing functional water whose physicochemical properties are changed through the process of first generating brown gas and injecting it within the above pressure range and injection time range, it is advantageous in that mass production can be performed by checking only the pressure and injection time of the mixed gas to be injected.

The gas-dissolved water is injected into thin-layer chromatography, passed through a stationary phase provided in the thin-layer chromatography, filtered, and then fractionated to adjust the concentration of the dissolved gas in step S500.

Although the thin-layer chromatography was selected for filtration and separation of materials, it is not limited thereto if the device allows the gas-dissolved water to be introduced into the pipeline and is capable of being provided with a stationary phase that can adsorb and remove inorganic salts and ions excluding hydronium ions.

In an embodiment of the present disclosure, the stationary phase of the thin-layer chromatography may filter inorganic salts with a microporous polymer membrane.

The thin-layer chromatography can easily fractionate the filtered gas-dissolved water, and in the embodiment of the present disclosure, it may be adjusted to be fractionated in units of 100 ml, 200 ml, and 500 ml.

When the volume of gas-dissolved water is reduced according to the fractionation process, it is very advantageous to maintain the concentration of the dissolved gas.

According to another aspect of the present disclosure, a method for cultivating plants using hydronium ion-dissolved water according to the present disclosure includes:

(1) preparing hydronium ion-dissolved water according to the method for preparing hydronium ion-dissolved water;
(2) preparing functional water by adding silica to the hydronium ion-dissolved water; and
(3) applying the functional water to crop.

Figure 2:
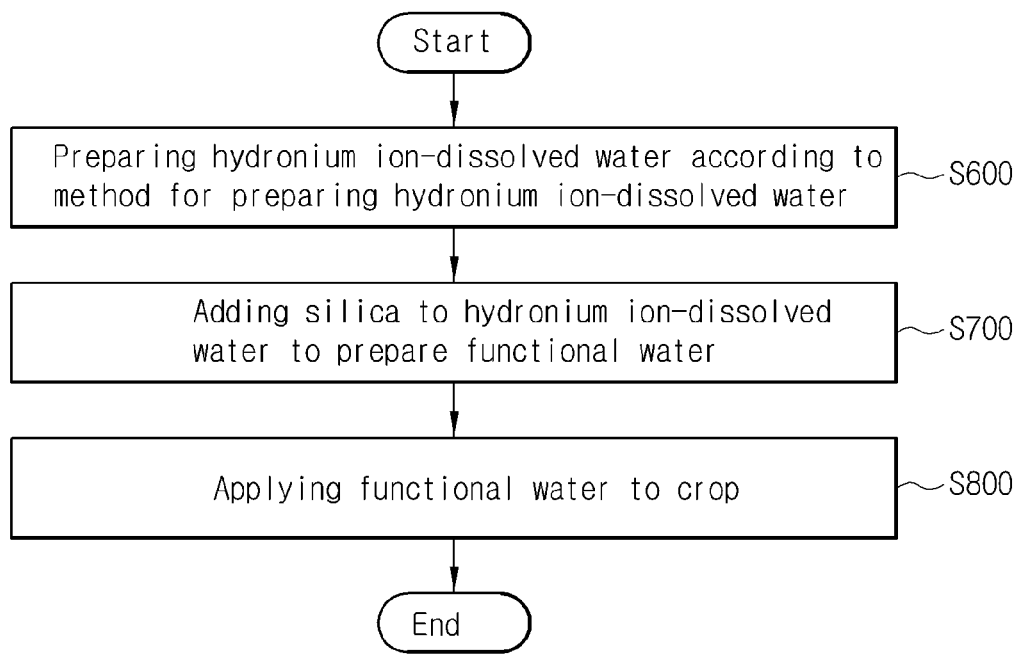
FIG. 2 is a flow chart of a method for cultivating plants using hydronium ion-dissolved water according to another embodiment of the present disclosure.

FIG. 2 is a flow chart of a method for cultivating plants using hydronium ion-dissolved water according to another embodiment of the present disclosure.

Referring to FIG. 2, first, the hydronium ion-dissolved water is prepared according to the method for preparing the hydronium ion-dissolved water, in step S600.

Functional water is prepared by adding silica to the hydronium ion-dissolved water in step S700.

When the silica ($SiO_2$) is added, it is possible to greatly increase the growth rate at the beginning of plant growth by removing heavy metals that adversely affect plant growth.

In particular, when the silica is added, it has the advantage of being able to significantly reduce the content of heavy metals during final harvesting by effectively controlling heavy metals that can be concentrated in food crops.

The functional water is applied to the crop in step S800.

When the functional water is sprayed onto plants using a spray and applied in the form of droplets, direct disinfection and virus suppression effects are expressed on the leaf surface and stem, which is very advantageous for plant growth.

MODE(S) FOR CARRYING OUT THE INVENTION

Hereinafter, preferred examples are presented to aid in the understanding of the present disclosure, but the following examples are only illustrative of the present disclosure, and the scope of the present disclosure is not limited to the following examples.

Example 1. Preparation of Hydronium Ion-Dissolved Water

Distilled water was prepared, and using a deionized water producing apparatus (Biotech Purist, 1-1.5 L/min) provided with an ion exchange resin, the deionized water was prepared so that the specific resistance was 18 MΩ·cm.

The prepared deionized water was supplied to a sealed batch reactor.

A reactor having a hemispherical gas collection unit provided at the top and an electrolytic electrode arranged at the bottom was prepared, and 0.03 g of sodium hydroxide (NaOH) was added to 1000 mL of water inside the reactor to form an electrolyte, and then the water was electrolyzed by operating a power supply connected to the electrode submerged in the water and allowing a current of 10 mV to flow with a voltage of 220 V.

A water supply unit was provided at one side of the reactor for automatic water supply after a certain period of time, so as to allow the electrolysis process of water to be performed continuously.

While transferring the brown gas generated in the gas collection unit through a pump, an air pump provided at one side of the pump was operated together to adjust the brown gas and air to be mixed in a volume ratio of 1:2.

The pump and the air pump were placed inside a sound-proof case made of stainless steel to reduce noise generated during mixing and to maintain safety.

The mixed gas was sent to a pressure pump, pressurized, and supplied to the deionized water injected into the batch reactor while the pressure was adjusted to 50 psi through a pressure gauge.

At this time, the supply pipe was extended to the center of the lower part of the batch reactor so that the mixed gas could directly contact the deionized water, and the mixed gas was injected into the deionized water through the supply pipe so that the mixed gas was dissolved in excess as the deionized water was aerated.

The mixed gas was continuously supplied to form a stream, dissolved for 30 to 2 hours, discharged after 30 minutes, 1 hour, 2 hours, and passed through a thin-layer chromatography provided with a microporous polymer membrane (pore diameter 10 μm or less) to be filtered, and after fractionation in units of 100 ml, 300 ml and 500 ml, was injected into a pressure vessel to be maintained slightly higher than atmospheric pressure, so as to maintain a dissolved gas content of 2.5 to 2.7 vol %, thereby preparing hydronium ion-dissolved water.

The pressure vessel was opened and used when applying the prepared dissolved water according to purpose.

Experimental Example 1. Hydronium Ion-Dissolved Water Properties

The objective was to confirm the physical properties of the hydronium ion-dissolved water prepared according to Example 1.

Hydronium ions form donor bonds through three hydrogen bonds to water molecules, wherein oxygen atoms show hydrophobicity, and hydronium ions themselves show amphiphilic characteristics, which deviate from the general characteristics of water, and thus exhibit the unique properties of hydronium ions.

In particular, water molecules and hydronium ions form a solvate and can substantially exhibit an effect of transferring protons to other molecules, and exhibit various physicochemical properties depending on the proton transfer effect.

First, in order to confirm the disinfection and bleaching effect, etc. the infrared spectrum was confirmed by comparing with commercial sodium hypochlorite (Uni chemical, 12%).

Figure 3:
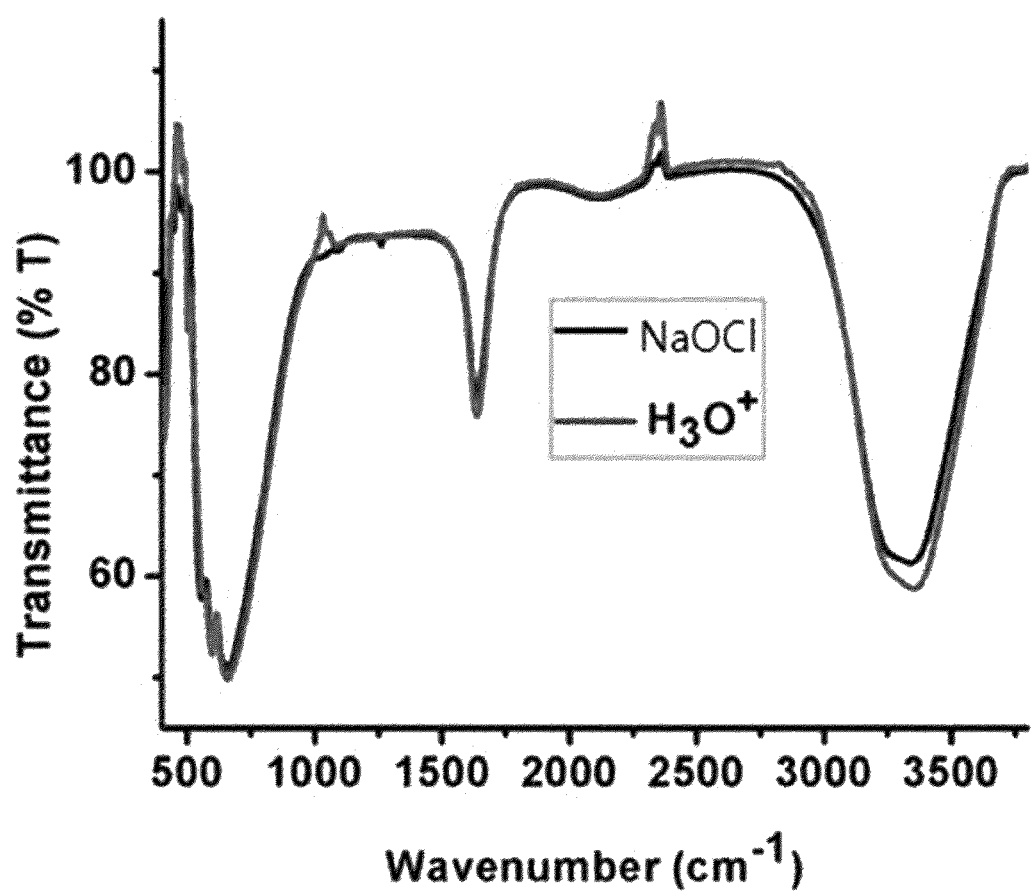
FIG. 3 is a graph showing an infrared spectrum of hydronium ion-dissolved water according to an embodiment of the present disclosure.

FIG. 3 is a graph showing an infrared spectrum of hydronium ion-dissolved water according to an embodiment of the present disclosure.

Referring to FIG. 3, it was confirmed that the hydronium ion-dissolved water had a molecular structure similar to that of a sodium hypochlorite solution used as a bleaching agent by 95.62%, and thus could be used as a bleaching agent.

Figure 4:
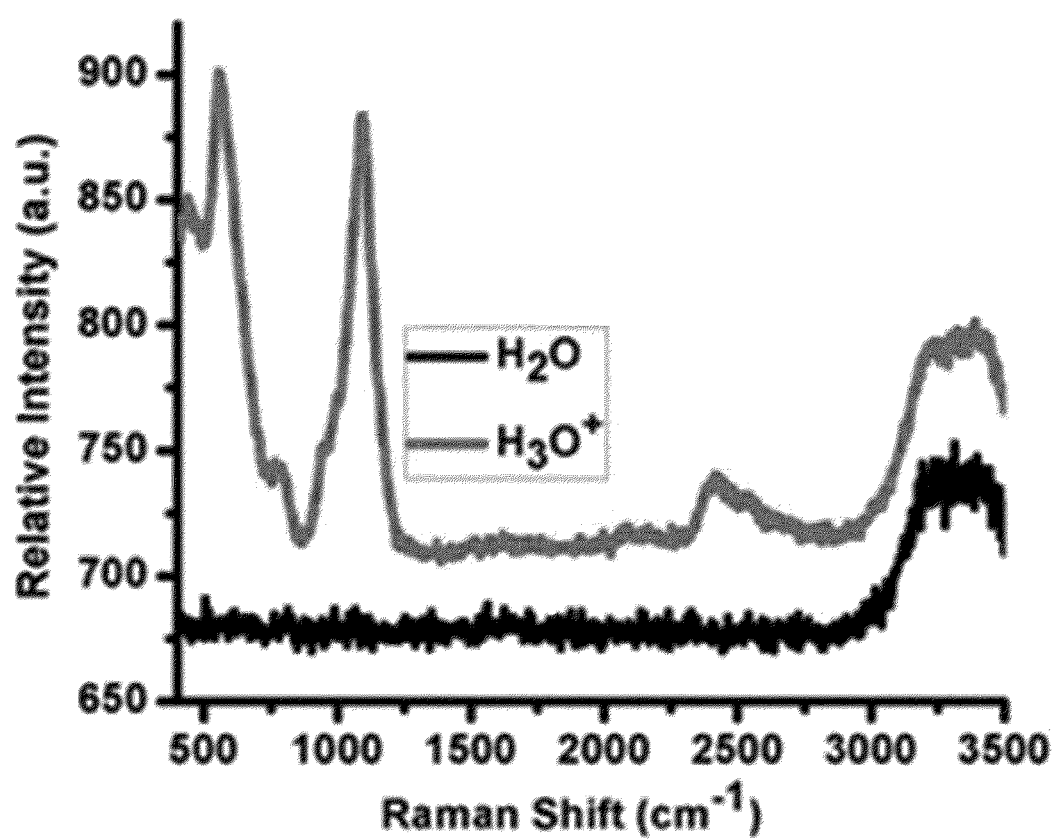
FIG. 4 is a graph showing a Raman spectrum of hydronium ion-dissolved water according to an embodiment of the present disclosure.

FIG. 4 is a graph showing a Raman spectrum of hydronium ion-dissolved water according to an embodiment of the present disclosure.

Referring to FIG. 4, the relative strength increases at 578 and 3,636 $cm^{-1}$ positions, which cannot be found in electrolytic reduced water prepared according to conventional electrolysis, thus indicating O—H scissoring, C—H stretching, and O—H stretching unique to hydronium ions, and so it was confirmed that the hydronium ion-dissolved water has a completely different structure from water molecules and exists in deionized water.

Experimental Example 2. Dissolution Time of Mixed Gas According to the Preparation of Hydronium Ion-Dissolved Water On the other hand, in order to confirm the change in the total amount of hydronium ions according to the dissolution time of the mixed gas in the hydronium ion-dissolved water prepared according to Example 1, samples were collected after dissolving for 30 minutes, 1 hour, 2 hours and 4 hours, respectively, and the Raman spectrum thereof was analyzed.

Figure 5:
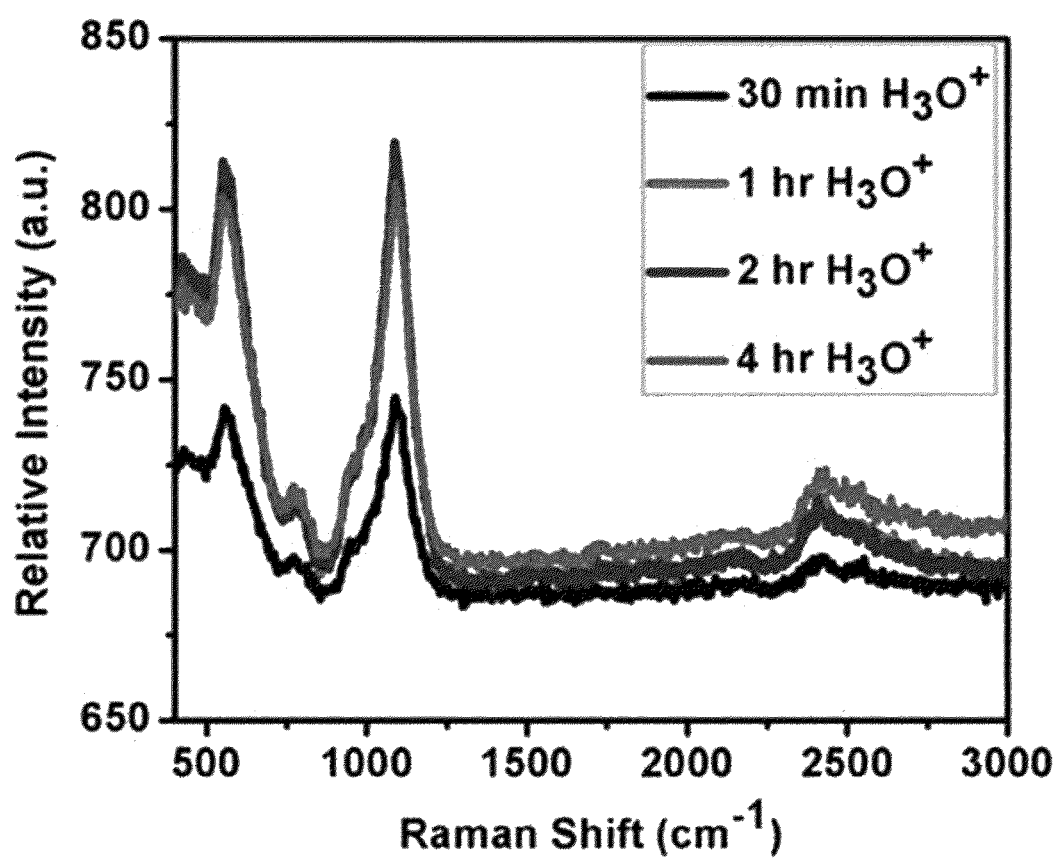
FIG. 5 is a graph showing a Raman spectrum of a sample according to dissolution time of a mixed gas in a method for preparing hydronium ion-dissolved water according to an embodiment of the present disclosure.

FIG. 5 is a graph showing a Raman spectrum of a sample according to a dissolution time of a mixed gas in a method for preparing hydronium ion-dissolved water according to an embodiment of the present disclosure.

Referring to FIG. 5, when dissolved for 2 hours or more, relative intensity increased the most, and it was confirmed that a large amount of hydronium ions existed. When the time exceeded 4 hours, the difference in strength was not confirmed, and thus it was confirmed that the time for preparing dissolved water capable of optimally increasing the dissolved amount of hydronium ions was 2 to 4 hours.

Experimental Example 3. Hydronium Ion-Dissolved Water Cell Activity Effect

When the potential of the cell surface was changed according to the proton transfer effect of hydronium ion dissolved water, it was expected that it would have an effect on cell activity, so it was applied to various symptoms.

Figure 6:
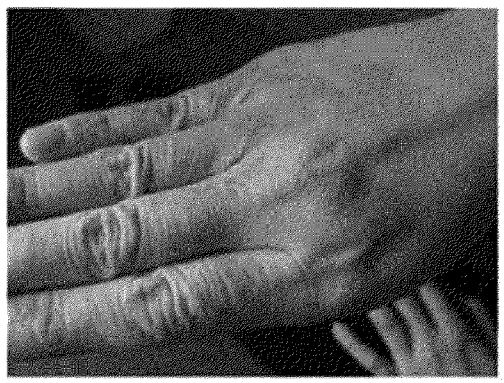
FIG. 6 is a picture showing changes before and after application to various conditions in order to confirm the cellular activity effect of the hydronium ion-dissolved water according to an embodiment of the present disclosure.
Figure 6:
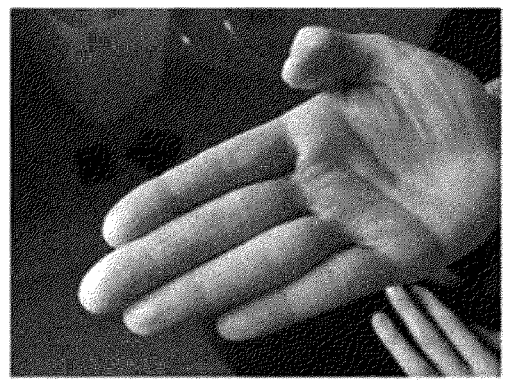
Figure 6:
Figure 6:
Figure 6:
Figure 6:

FIG. 6 is a picture showing changes before and after application to various conditions in order to confirm the cellular activity effect of the hydronium ion-dissolved water according to an embodiment of the present disclosure.

Referring to FIG. 6, (A) of FIG. 6 is a picture showing the condition of a skin surface after 1 week of applying hydronium ion-dissolved water to skin eczema once a day.

(B) shows a skin surface with lupus symptoms after 1 week of applying once a day, and (C) shows a skin surface with a burn after 1 week of applying once a day.

Figure 7:
FIG. 7 is a picture showing changes before and after application to atopic symptoms in order to confirm the cellular activity effect of the hydronium ion-dissolved water according to an embodiment of the present disclosure.

FIG. 7 is a picture showing changes before and after application to atopic symptoms in order to confirm the cellular activity effect of the hydronium ion-dissolved water according to an embodiment of the present disclosure.

Referring to FIG. 7, in particular, it was confirmed that pruritus disappeared when applied, and red spots faded after 3 days, and it was confirmed that pruritus did not appear in the regeneration process of the skin, so it was very effective in relieving atopic symptoms.

In each disease, inflammation disappeared, cell activity was promoted, and wound recovery was accelerated, confirming effects of cell activity and inflammation suppression.

It was confirmed to be highly adaptive to cell inflammatory diseases, and was found to be effective for diseases such as atopy, various dermatitis and asthma.

Experimental Example 4. Cancer Cell Inhibitory Ability

In order to confirm whether a change in cell surface potential caused by proton transfer can inhibit cancer cell growth, 200 ml and 500 ml of hydronium ion-dissolved water was added to Hela cells placed in the culture medium, and cell proliferation was examined.

Figure 8:
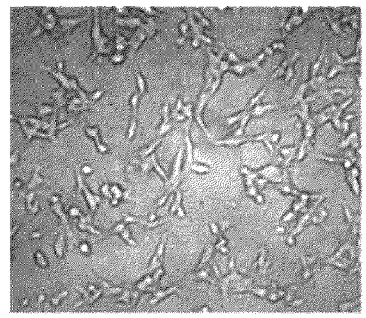
FIG. 8 is a scanning electron microscope picture of a Hela cell cultured with hydronium ion-dissolved water according to an embodiment of the present disclosure.
Figure 8:
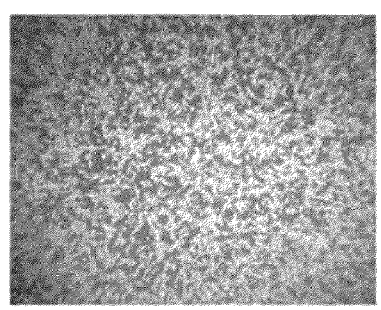
Figure 8:
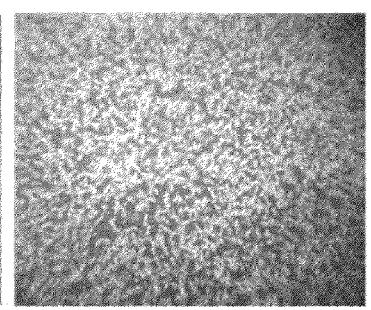

FIG. 8 is a scanning electron microscope picture of a Hela cell cultured with hydronium ion-dissolved water according to an embodiment of the present disclosure.

Referring to FIG. 8, compared to the control group, after one week, cell proliferation was no longer detected, and as the content of the hydronium ion-dissolved water increased, it was confirmed that the cell death or the discontinuation of differentiation was accelerated, thus it was confirmed that it can also show cancer cell inhibitory ability.

Experimental Example 5. Plant Growth

In order to confirm that the hydronium ion-dissolved water affects plant growth, the hydronium ion-dissolved water according to Example 1 was sprayed onto the target plant as droplets starting from the germination period and repeatedly applied.

Figure 9:
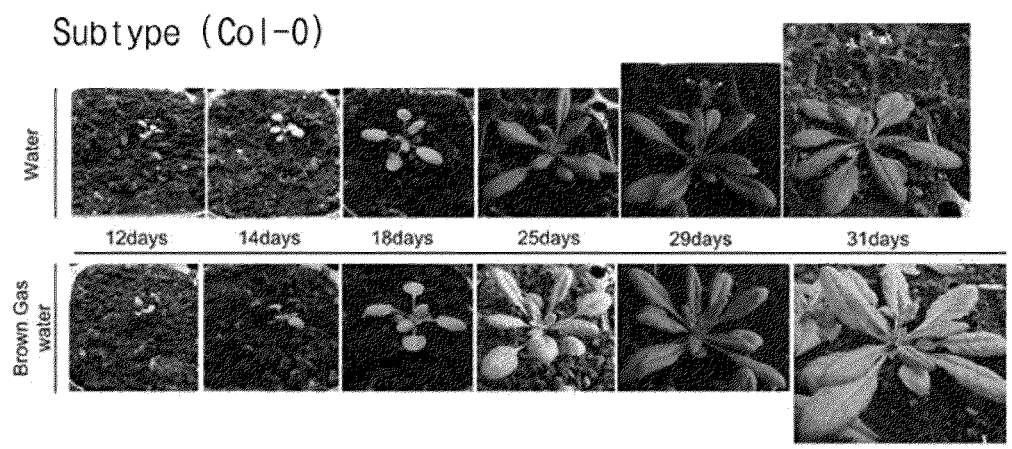
FIG. 9 is a picture confirming the growth process of a plant (Col-0) in a method for cultivating plants using hydronium ion-dissolved water according to another embodiment of the present disclosure.
Figure 9:
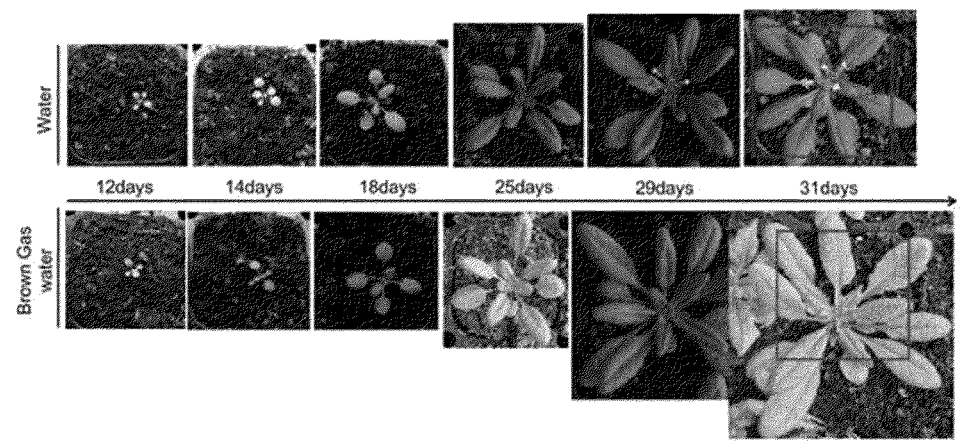

FIG. 9 is a picture confirming the growth process of a plant (Col-0) in a method for cultivating plants using hydronium ion-dissolved water according to another embodiment of the present disclosure.

Referring to FIG. 9, the growth of *Arabidopsis* wild-type Columbia-0 (Col-0) was applied with general water and hydronium ion-dissolved water, and growth was compared for 31 days.

It was confirmed that the flowering period can be very late, and the size of the plant was greatly increased.

Figure 10:
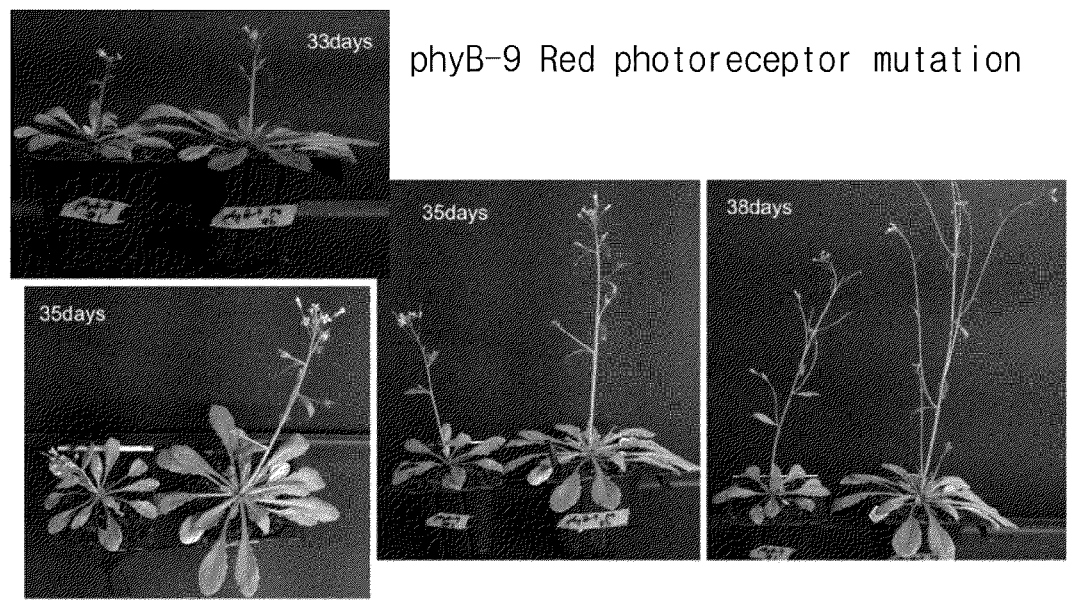
FIG. 10 is a picture confirming the growth process of a plant (phyB-9) in a method for cultivating plants using hydronium ion-dissolved water according to another embodiment of the present disclosure.

FIG. 10 is a picture confirming the growth process of a plant (phyB-9) in a method for cultivating plants using hydronium ion-dissolved water according to another embodiment of the present disclosure.

Referring to FIG. 10, when compared with the application of water (left) and hydronium ion-dissolved water (right) using the phyB-9 red photoreceptor mutation used in the development and genetics experiments, it was confirmed that the application of hydronium ion-dissolved water showed significantly rapid and excellent growth.

Therefore, in the method for preparing hydronium ion-dissolved water according to the present disclosure, the optimum conditions for preparing hydronium ion-dissolved water in a larger amount were confirmed, and various physical properties can be exhibited by the proton transfer effect by changing the physical properties of the water, and it is possible to increase physicochemical properties such as disinfection and bleaching, as well as biological effects such as increase in cell activity.

The present disclosure has been described with reference to the embodiments shown in the drawings, but these are merely exemplary, and those of ordinary skill in the art will appreciate that various modifications and equivalent other embodiments are possible therefrom. Therefore, the true technical protection scope of the present disclosure should be determined by the technical spirit of the appended claims.

The invention claimed is:

1. A method for preparing hydronium ion-dissolved water comprising:
   (a) purifying distilled water to prepare deionized water;
   (b) electrolyzing the water to produce a brown gas stream;
   (c) mixing air with the brown gas stream to form a mixed gas stream;
   (d) injecting the mixed gas stream into the deionized water and dissolving the mixed gas to prepare gas-dissolved water; and
   (e) injecting the gas-dissolved water into thin-layer chromatography, filtering the gas-dissolved water through a stationary phase provided inside the thin-layer chromatography, and then fractionating to adjust the concentration of dissolved gas.

2. The method of claim 1, wherein said step (a) comprises passing the distilled water through an ion exchange resin such that the specific resistance is adjusted to 15 to 18 $M\Omega \cdot cm$.

3. The method of claim 1, wherein said step (b) comprises:
   adding sodium hydroxide to the water at 0.01 to 0.05% (w/w), and applying a voltage of 100 to 110 V and a current of 10 to 20 mA to generate the brown gas stream.

4. The method according to claim 1, wherein said step (b) comprises passing the brown gas stream through a filter to be filtered.

5. The method according to claim 1, wherein said step (c) comprises diluting the concentration of hydrogen and oxygen in the brown gas stream by mixing air with the brown gas stream in a volume ratio (v/v) of 1:1~2.

6. The method according to claim 1, wherein said step (d) comprises dissolving the mixed gas stream in the deionized water by pressurizing the mixed gas stream at a pressure of 50 to 100 psi.

7. The method according to claim 1, wherein said step (d) comprises dissolving the mixed gas stream by injecting the mixed gas stream into the deionized water for 30 minutes to 2 hours.

8. The method according to claim 1, wherein said step (d) comprises dissolving hydronium ions ($H_3O^+$) by injecting the mixed gas stream into the deionized water.

9. The method according to claim 1, wherein said step (e) comprises injecting the gas-dissolved water into the thin-layer chromatography, and using the stationary phase of the thin-layer chromatography to filter inorganic material with a microporous polymer membrane.

10. The method according to claim 1, wherein said step (e) comprises:

fractionating the gas-dissolved water that is injected into the thin-layer chromatography, filtered, and then discharged, and injecting the fractionated gas-dissolved water into a pressure vessel such that the concentration of the dissolved gas in the gas-dissolved water is adjusted to 2.5 to 2.7 vol %.

\* \* \* \* \*